INVENTOR.
JAMES D. BROWN
BY
*H.C. ...*
ATTORNEY.

Feb. 17, 1953   J. D. BROWN   2,628,466
CARTON CLOSING MACHINE
Filed July 14, 1950   12 Sheets-Sheet 3

INVENTOR.
JAMES D. BROWN
BY
ATTORNEY.

Feb. 17, 1953     J. D. BROWN     2,628,466
CARTON CLOSING MACHINE
Filed July 14, 1950     12 Sheets-Sheet 5

INVENTOR.
JAMES D. BROWN
BY
ATTORNEY.

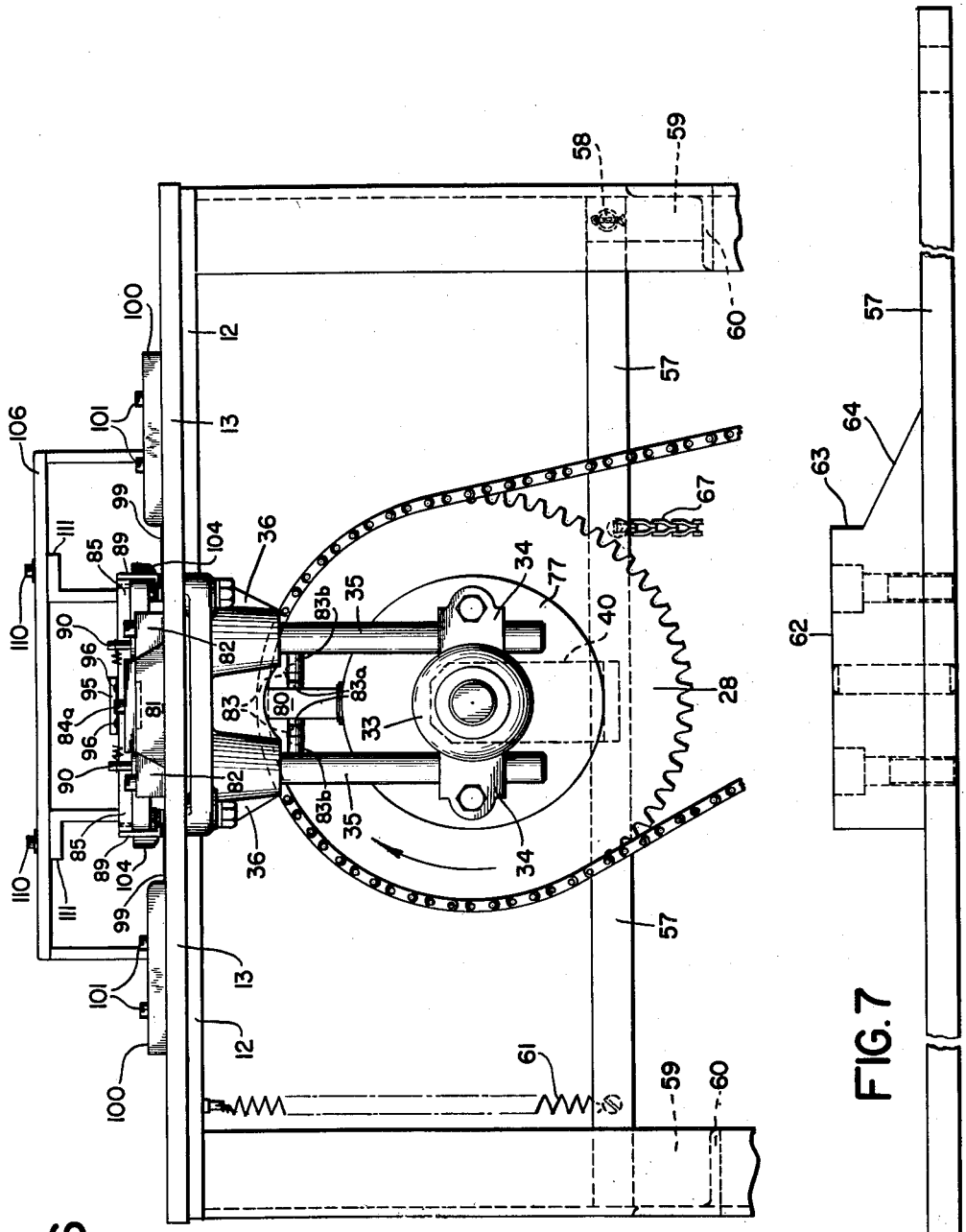

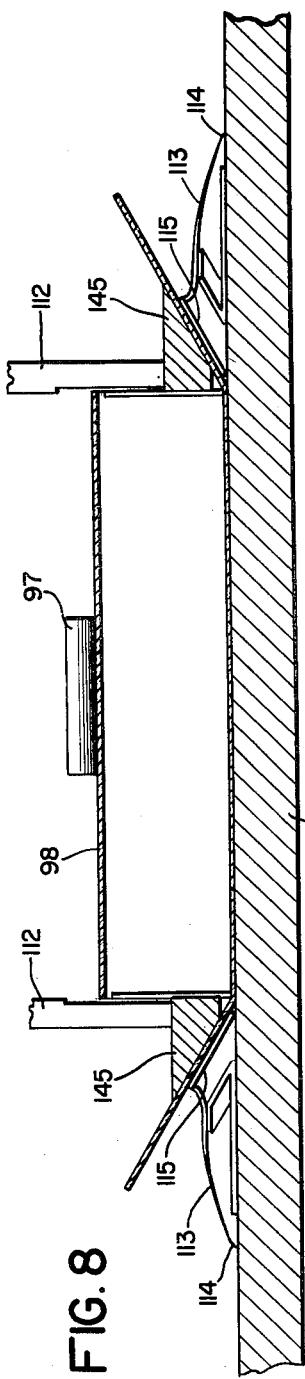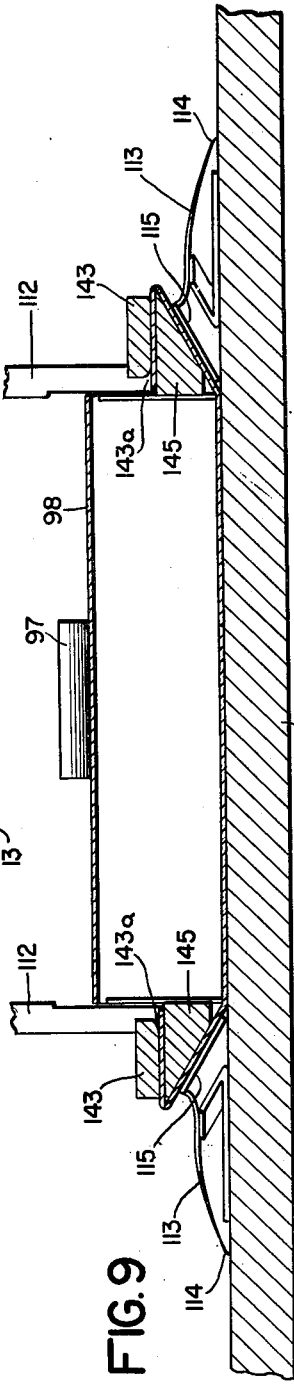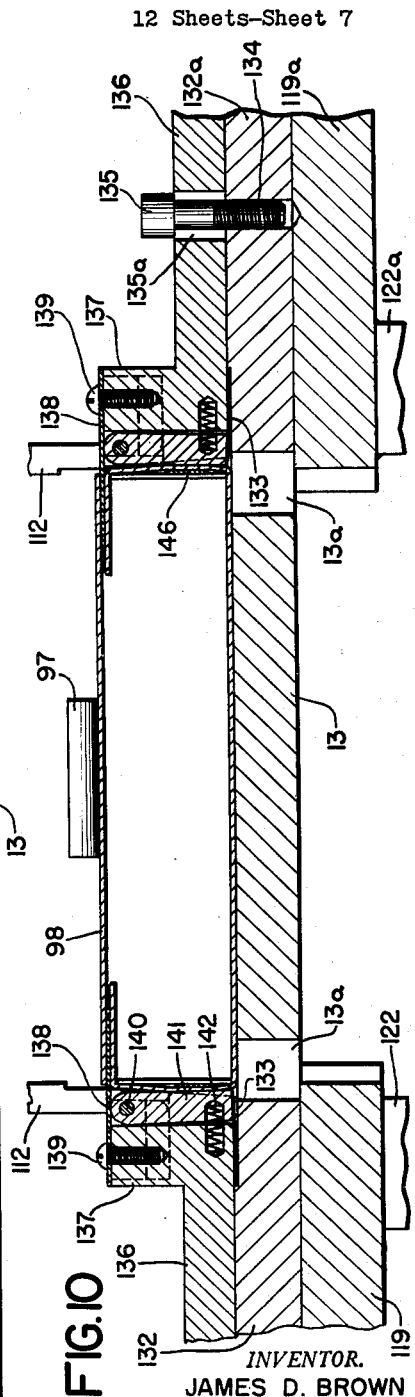

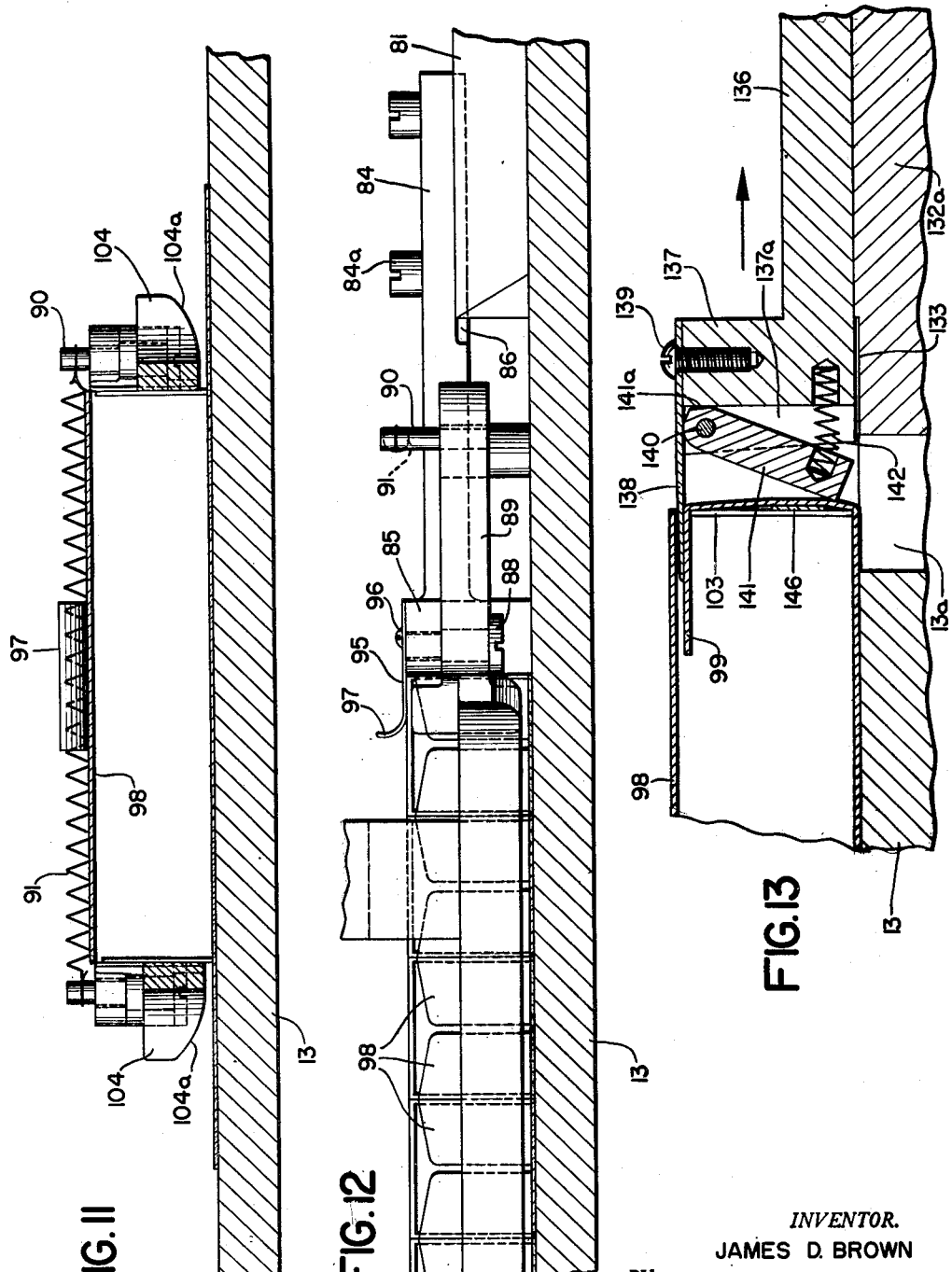

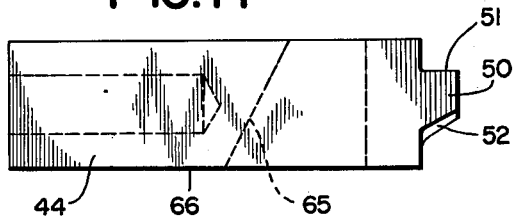
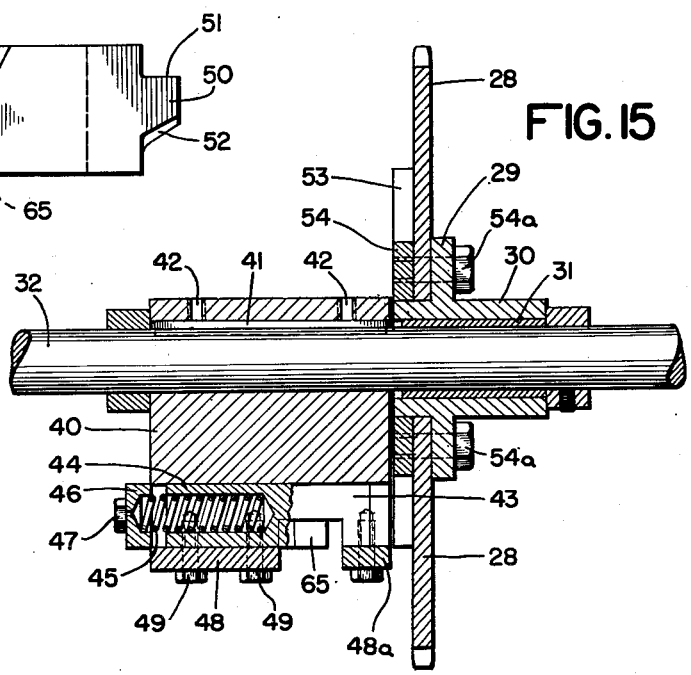
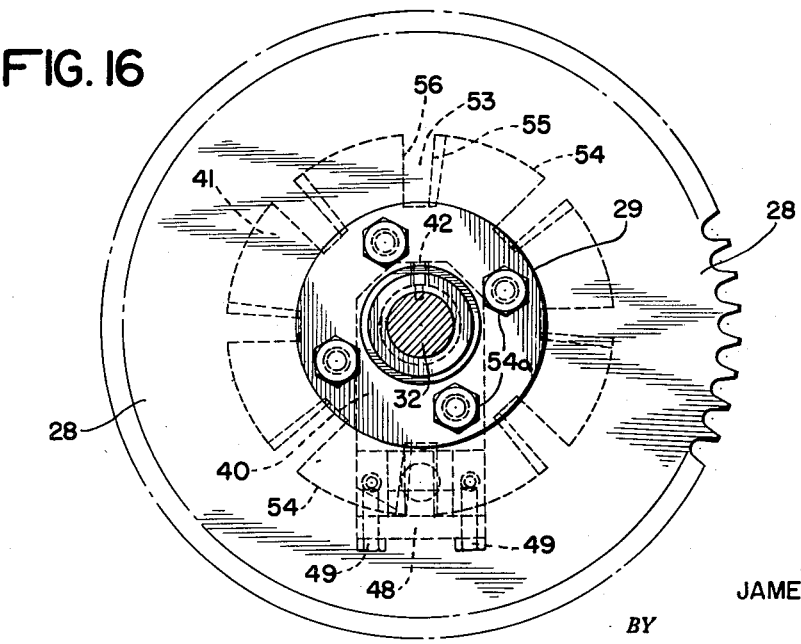
INVENTOR.
JAMES D. BROWN
BY
ATTORNEY.

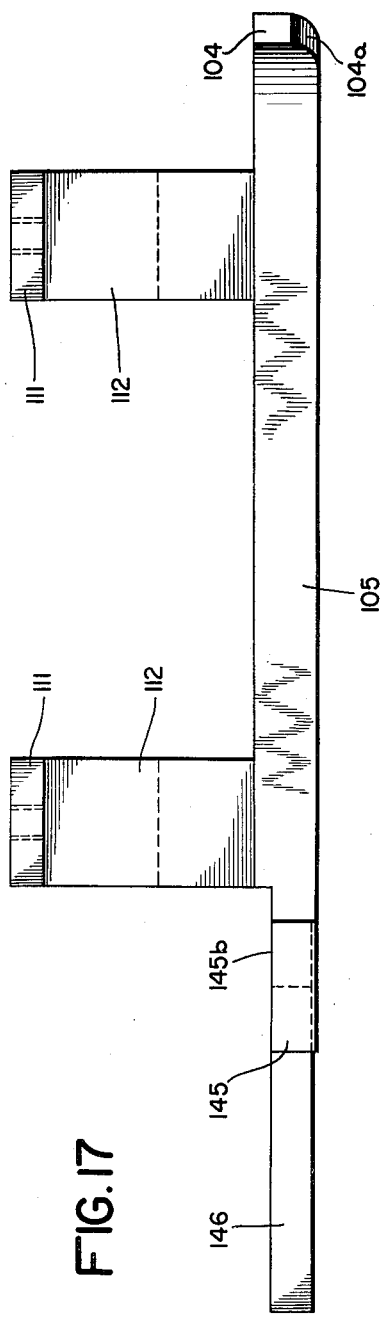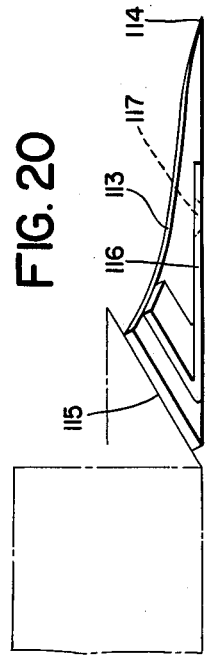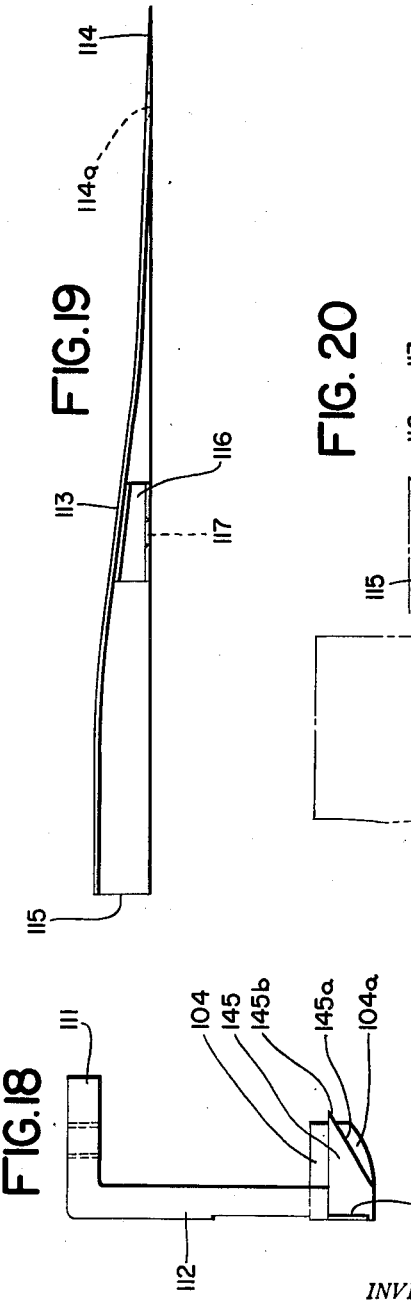

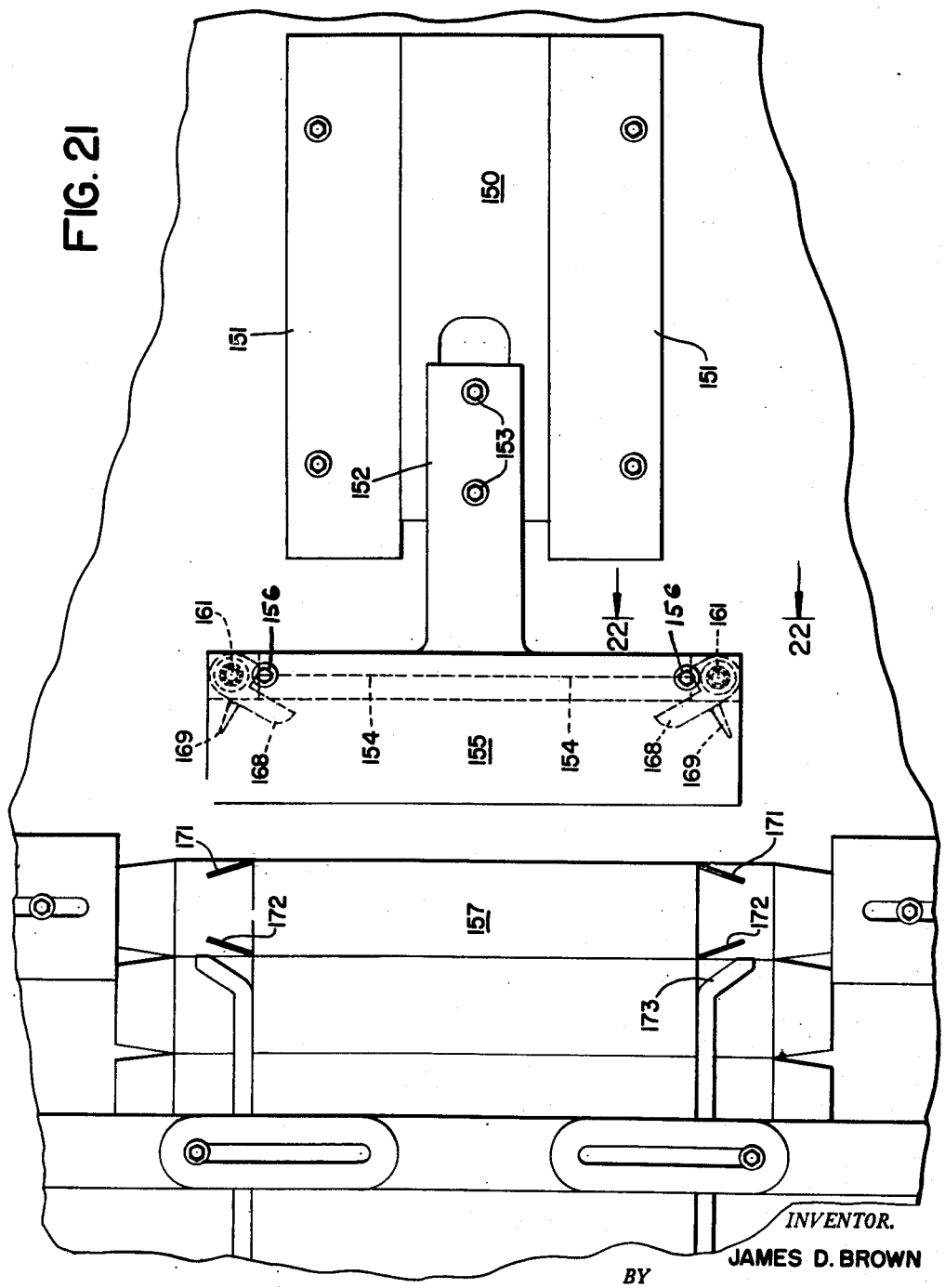

Feb. 17, 1953 J. D. BROWN 2,628,466
CARTON CLOSING MACHINE
Filed July 14, 1950 12 Sheets-Sheet 12
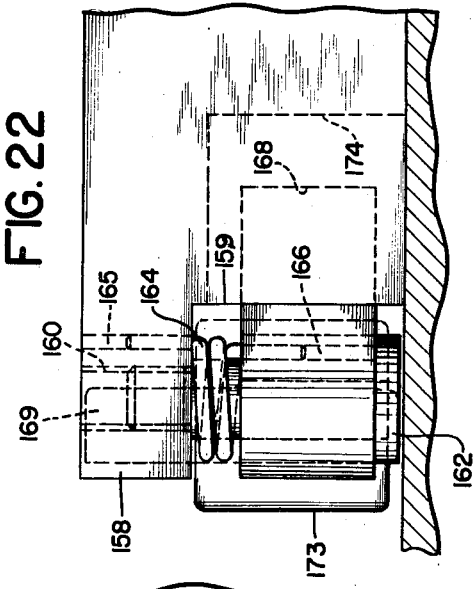
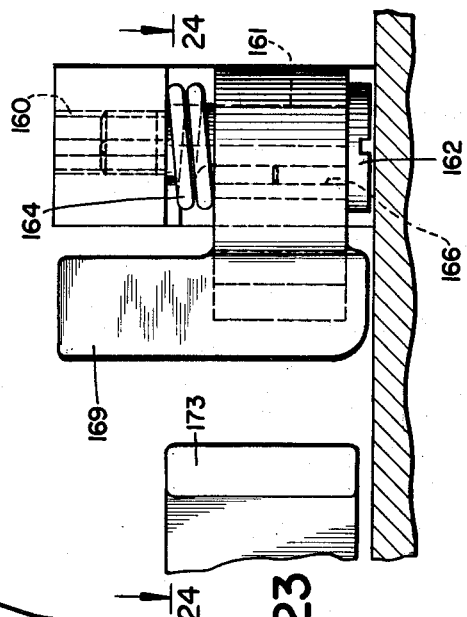
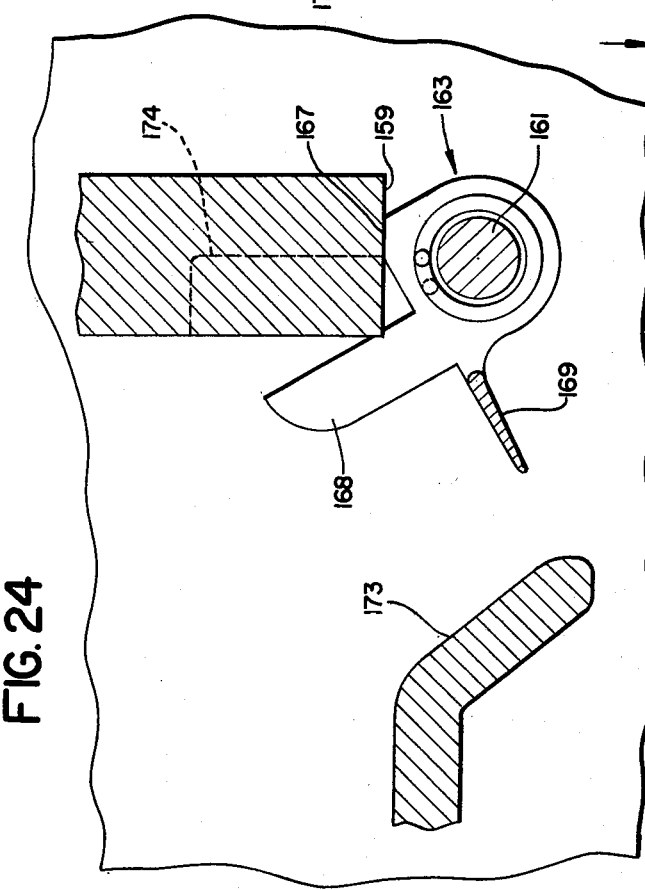
INVENTOR.
JAMES D. BROWN
BY
ATTORNEY.

Patented Feb. 17, 1953

2,628,466

UNITED STATES PATENT OFFICE 2,628,466

CARTON CLOSING MACHINE

James D. Brown, Livingston, N. J., assignor to Bristol-Myers Company, New York, N. Y., a corporation of Delaware Application July 14, 1950, Serial No. 173,777

13 Claims. (Cl. 53—145)

This invention relates to a machine adapted to fold and insert the various tabs and end flaps of cartons of the type used for the packaging of small articles, such as tubes of toothpaste, shaving cream and the like, small bottles or jars and similar items. By suitable modification as to size and the like, the machine may be used for the closing of cartons employed in the packaging of a wide variety of products, of almost any character. The machine operates in a semi-automatic manner to perform various operations, heretofore ordinarily performed by hand, in the closing of cartons into which the articles to be packaged have been previously inserted or are inserted at the time they are fed to the machine. As they are supplied to the machine the two ends of the carton are open and the machine then automatically infolds the usual end tabs of the carton and then folds and inserts the main closing flaps of the carton at its two ends to complete the packaging of the article. If desired, the machine may be made more completely automatic by providing automatic means for feeding the cartons to the receiving end of the machine.

A primary object of the invention has been to provide a machine of the character indicated which is of simple and inexpensive construction, is easily operated and maintained and is capable of rapidly performing the carton closing operations mentioned without injury to the cartons or their contents.

The machine constructed in accordance with the invention may be operated either continuously or intermittently in a rapid succession of cycles. If automatic feeding means is provided for supplying cartons to the receiving end of the machine, the latter may be operated continuously. However, if the cartons are fed to the machine by hand it is preferably operated intermittently and each cycle is initiated by the operator through the depression of a treadle or the similar operation at will of a suitable control member. The arrangement is such that upon the operation of the treadle, or other controlling means, the main shaft of the machine is almost instantly connected with a constantly rotating member to cause the machine to be operated through a single cycle. In the course of this cycle the carton which has been introduced at the receiving end of the machine is subjected to the folding inwardly of the tabs at both ends simultaneously with the one-step advance of the group of cartons through the machine. During the same cycle of operation another carton, of the group being advanced, is subjected at one station to a partial folding of the closing flaps at the two ends of the carton, while at a subsequent station a further carton has the pre-folded flaps introduced to complete the closing of the carton. The arrangement is such that a single reciprocating member at each side of the advancing line of cartons serves to perform the pre-folding operation on the flap of one carton and the inserting operation on the flap of another carton. As new cartons are continuously supplied to the machine and the line or group of cartons is fed through the machine, they emerge one by one in fully closed condition and may be removed either automatically by conveyor or manually for such further disposition as may be desired.

Inportant features of the invention reside in the provision of simple but reliable mechanisms for performing the various functions set forth above and for protecting the cartons and their contents against injury. Simple means for adjusting various parts serve to eliminate the necessity of fine tolerances in the production of the parts and also enable various primary portions of the construction to be used in machines adapted to close cartons of different sizes and proportions.

Other objects, features and advantages of the invention will appear from the following detailed description of an illustrative form of the same, which will now be given in conjunction with the accompanying drawings in which:

Fig. 6 is a front elevational view of the upper portion of the machine with certain parts omitted for clearness of illustration;

Fig. 7 is an enlarged detail view in plan of a control lever embodied in the machine parts being broken away to condense the view;

Fig. 8 is an enlarged detail view in vertical section, taken along the line 8—8 of Fig. 4;

Fig. 9 is a similar vertical sectional view taken along the same line as Fig. 8 but at a different stage in a cycle of operation of the machine.

Fig. 10 is a similar vertical sectional view taken along the line 10—10 of Fig. 4 at the same stage in a cycle of operation as Fig. 9;

Fig. 11 is an enlarged detail view in vertical section, taken along the line 11—11 of Fig. 4;

Fig. 12 is another enlarged detail view in vertical section, taken along the line 12—12 of Fig. 4;

Fig. 13 is a further enlarged detail view of certain of the parts illustrated in Fig. 10, but at an intermediate stage in a cycle of operation of the machine;

Fig. 14 is a plan view of an element forming part of a one revolution clutch embodied in the machine;

Fig. 15 is an axial sectional view taken through the clutch and associated parts;

Fig. 16 is an end elevational view of the clutch and associated parts as seen from the right in Fig. 15, the shaft being shown in section;

Fig. 17 is a side elevational view of a carton guiding element;

Fig. 18 is an end elevation of the guiding element as seen from the left in Fig. 17;

Fig. 19 is a side elevational view of a plow member embodied in the machine;

Fig. 20 is an end elevational view of the plow member as seen from the left in Fig. 19, a carton being indicated in broken lines in relation to the plow;

Fig. 21 is a plan view of a modified form of the means for advancing the cartons and infolding the tabs at the ends thereof;

Fig. 22 is a detail view in elevation taken along the line 22—22 of Fig. 21 showing a portion of the modified means;

Fig. 23 is a side elevational view of the part shown in Fig. 22; and

Fig. 24 is a horizontal sectional view taken along the line 24—24 of Fig. 23.

Figure 1:
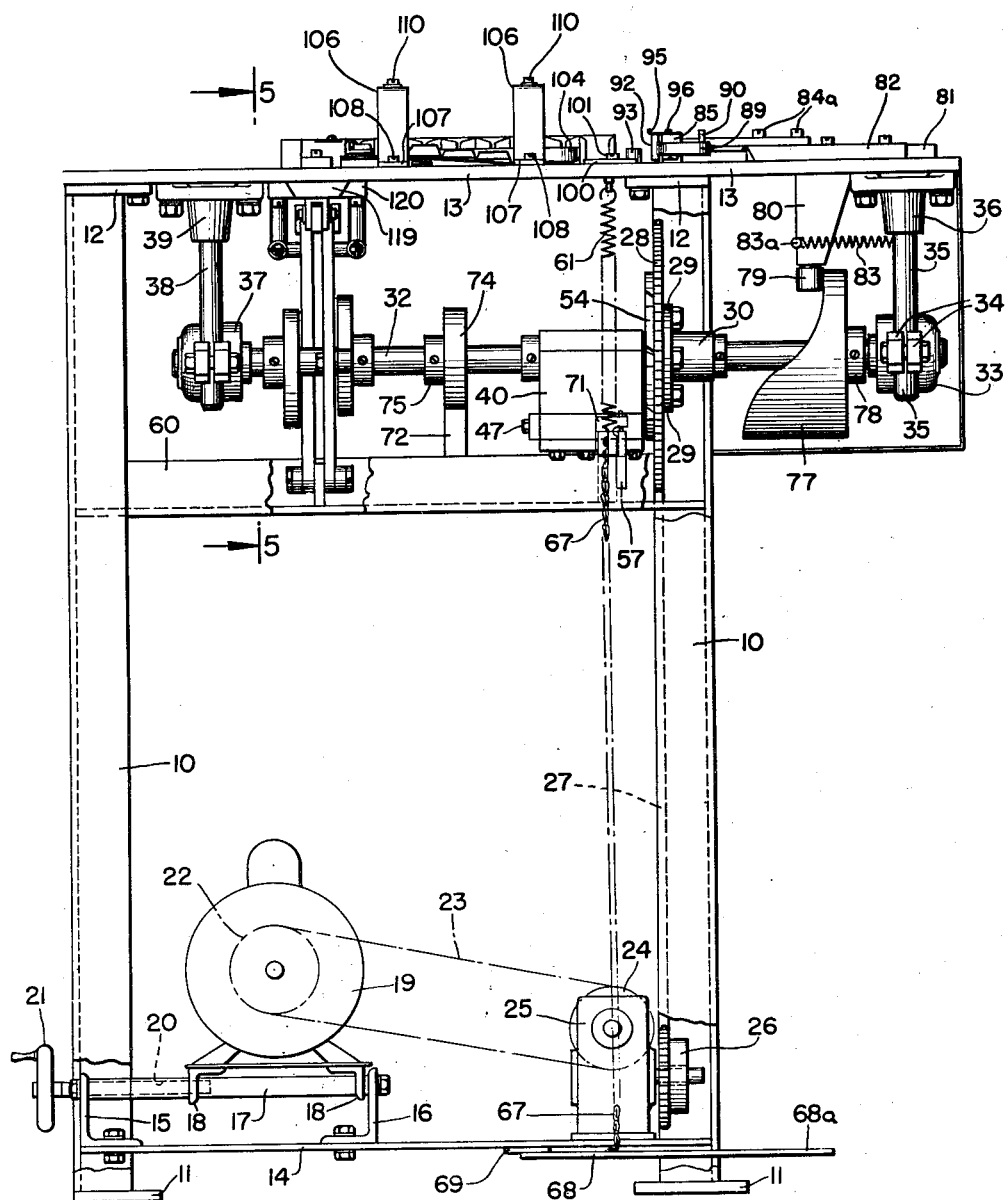
Fig. 1 is a side elevational view of a machine embodying the invention, certain parts being broken way to disclose normally concealed parts.
Figure 2:
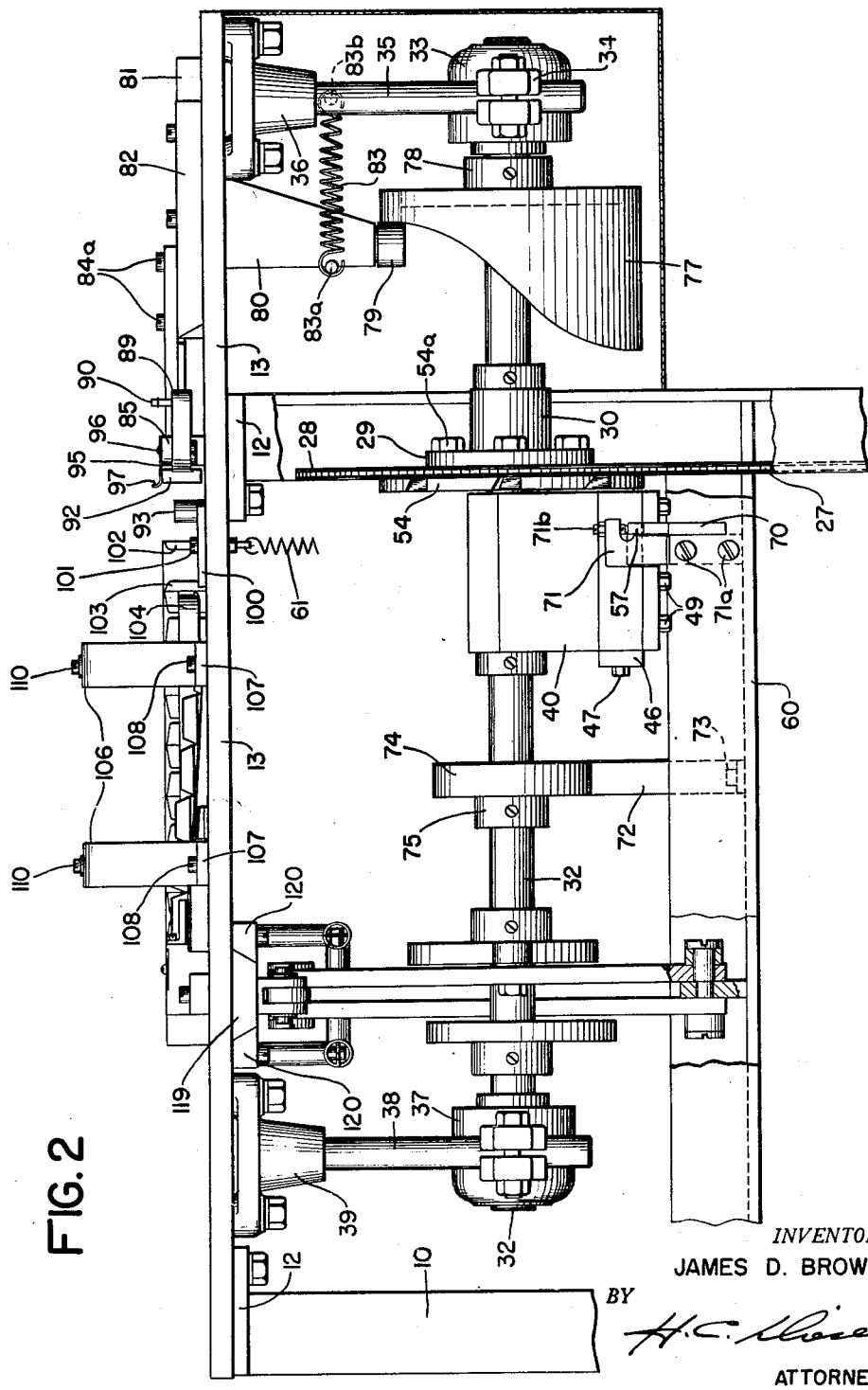
Fig. 2 is an enlarged view of the upper portion of the machine as illustrated in Fig. 1.

Referring now to the drawings, there is shown in Figs. 1 and 2 the main supporting structure for the machine comprising four leg members 10, in the form of angle bars, having plates 11 welded to the lower ends thereof. These may, if desired, be fastened by screws or the like to the floor. At their upper ends the angle bars 10 carry similar flat plates 12 which are welded thereto and serve to support a table member 13. Near the lower ends of the leg members there is secured, by welding or the like, a flat plate 14 spaced a slight distance above the floor and carrying a pair of angle members 15 and 16. These support the opposite ends of a pair of rods 17 which slidingly carry a pair of angle members 18 on which is mounted an electric motor 19. A screw threaded rod 20, intermediate the rods 17, having a handwheel 21 at its outer end, cooperates with a threaded opening in one of the angle members 18 to adjust the latter longitudinally along the rods 17. Motor 19 has a pulley 22 connected by a belt 23 with a pulley 24 mounted on the driven shaft of a speed reducer 25 supported by the plate 14. A sprocket 26 secured to the low speed or driving shaft of the speed reducer is connected by a chain 27 with a sprocket 28 secured to a radially extending flange 29 (Figs. 2, 15 and 16) integral with a sleeve 30 which is mounted on an oilite bearing sleeve 31 carried by a main operating shaft 32 of the machine. Shaft 32, as best shown in Figs. 2 and 6, is journaled at its right end in a bearing member 33 having lateral extensions 34 which provide split collars adapted to be clamped upon a pair of rods 35. These extend downwardly from a supporting casting 36 secured by screws or the like to the underface of the table 13. The left end of the shaft 32 is similarly journaled in a bearing member 37 secured to a pair of downwardly extending rods 38 carried by a casting 39 secured to the under surface of the table 13. It will be apparent that the arrangement described permits vertical adjustment of the two ends of the shaft 32. This eliminates the necessity of extreme accuracy in the formation of the various parts.

Adjacent the sprocket 28 there is mounted on the shaft 32 (Figs. 2 and 15) a driven clutch member 40. This is connected for rotation with the shaft by means of a key 41 with which a pair of set screws 42 cooperate. A downwardly extending portion of the member 40 is provided with a longitudinally extending channel or groove 43 which is rectangular in cross-section. In this groove is slidingly mounted a block 44 having a socket arranged to receive a coil spring 45. The latter reacts at its outer end against a socket in a plate 46 secured by screws 47 to the face of the member 40. Plates 48 and 48a, similarly secured by screws 49 to the lower face of the member 40, serve to retain the block 44 in the channel.

The inner end of the block 44 is provided with a toothlike projection 50 (Fig. 14) having one of its side faces, 51, in a plane parallel with the side surfaces of the block and its opposite side face, 52, in a plane inclined to the plane of face 51, both longitudinally and in a direction from top to bottom of the projection. This projection is adapted to cooperate with any one of a series of notches or openings 53 in the periphery of a clutch disk 54, Figs. 2, 15 and 16, which is secured to the sprocket wheel 28 by screws 54a. The latter pass through the sprocket wheel and serve to clamp this between the disk 54 and the flange 29 of the sleeve 30. As will be explained, the block 44 is normally held in retracted position against the action of the spring 45 but when it is desired to drive the machine through a cycle the block is released, under control of the operator, and the spring 45 is then permitted to engage the tooth 50 with the first notch 53 that is brought into alignment with it. It will be understood that when the block is released for operation by the spring, the end of the tooth 50 will engage the adjacent face of the clutch disk 54 and when the outer edge of the face 52 reaches the adjacent edge of a correspondingly inclined surface 55, forming one wall of the notch 53, the tooth will be permitted to enter the notch. Surface 51 on the tooth will then be brought against a corresponding surface 56 forming the opposite wall of the notch 53. The clutch member 40 will then be carried through a cycle at the end of which the block 44 will be retracted in the manner to be explained.

Referring now to Figs. 6 and 7, a clutch controlling lever 57 is provided, this being pivoted at 58 on a forked member 59 welded or otherwise secured to an angle element 60 which extends across the side of the machine between two of the leg members 10. A spring 61 connected at its upper end to the under side of the table 13 and at its lower end to the lever 57 serves to draw the latter upwardly or in a clockwise direction (Fig. 6). A block 62 secured to one face of the lever 57 (Fig. 7) is cut away at its forward end to provide a shoulder 63, in a plane perpendicular to the lever 57, and a flat inclined camming surface 64 extending from said shoulder to the surface of the lever. This inclined surface normally engages a correspondingly inclined surface 65 (Fig. 14) provided at one edge of a notch formed in the under side of the block 44. Surface 63 at the same time cooperates with the side face 66 of the block 44. This serves to retain the block 44 in its inactive position indicated in Fig. 15. Lever 57 may be rocked downwardly in a counterclockwise direction by means including a chain 67 attached at its upper end to the lever, at an intermediate point, and at its lower end to a treadle member 68 (Fig. 1) pivoted at 69 on the under face of the plate 14. A forwardly extending portion 68a of the treadle is adapted to be engaged by the foot of the operator to bring about downward movement of the lever. When the lever is rocked in this manner the block 44 will be spring urged into engagement with the clutch member 54 in the manner explained. As the clutch member 40 approaches the end of a complete revolution, the surface 65 on the block 44 will be brought into engagement with the surface 64 on the lever to gradually cause retraction of the block. Such retraction will be completed by the momentum of the parts and the surface 63 on the lever will then engage the surface 66 on the block. Suitable means may be provided, if desired, for limiting the movement of the lever 57 in the two directions. For example, the outer end of the lever may cooperate with a slot 70 (Fig. 2) formed in the vertical leg of the angle member 60, the bottom of the slot 70 serving to limit the downward movement of th lever. Upward movement may be limited by an arm 71 carried by a plate secured by means of screws 71a to the vertical leg of the angle member 60. A set screw 71b carried by the arm 71 provides adjustment for the upper limit of movement of the lever 57.

Frictional braking means is preferably provided for retarding rotation of the shaft 32 when it is not positively driven. This tends to prevent overthrow of the driven parts. The braking means may comprise a strap member 72 secured by screws 73 to the horizontal leg of the angle member 60. The loop portion 74 of member 72 surrounds a wheel or disk 75 secured to the shaft 32. Loop 74 may grip the wheel as firmly as desired by appropriate tightening or loosening of a bolt 76. A lining of leather or other suitable braking material may be secured either to the outer surface of the wheel or the inner surface of the loop 74.

Figure 3:
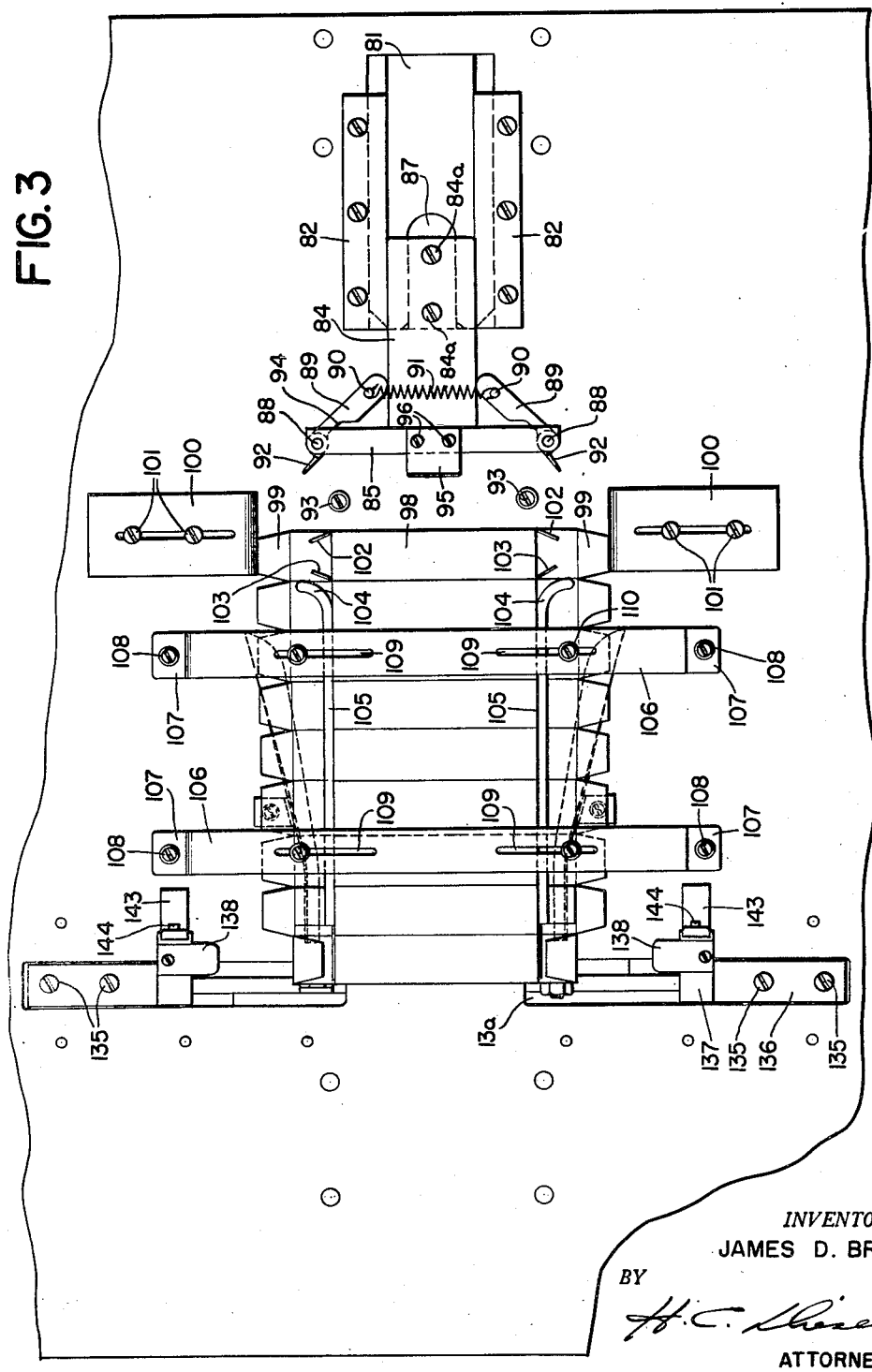
Fig. 3 is a top plan view of the machine with parts of the supporting structure broken away.
Figure 4:
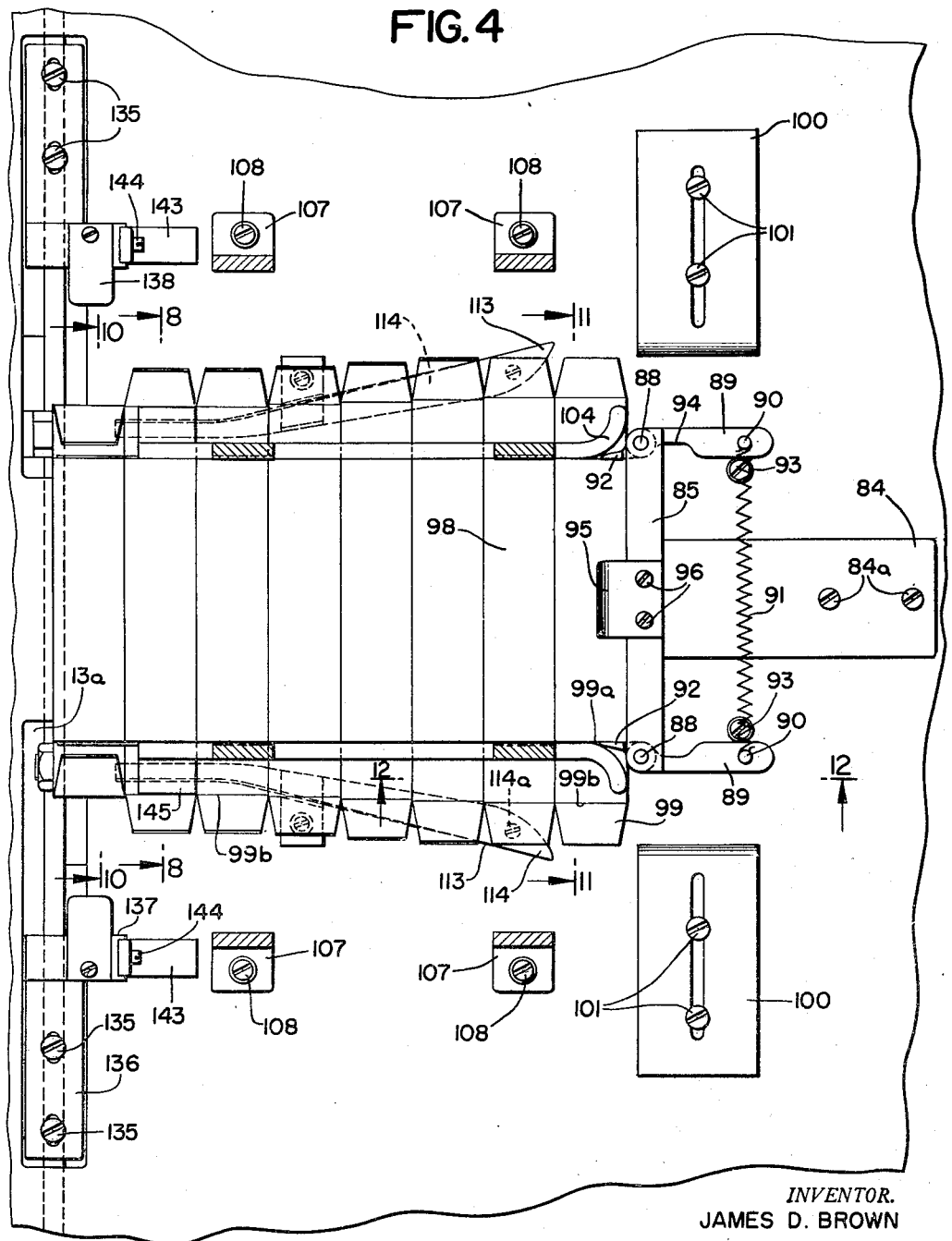
Fig. 4 is an enlarged top plan view of the portion of the machine adjacent the end at which the cartons are introduced, the operated parts being shown at a different point in their cycle from the position indicated in Fig. 3.

Adjacent the bearing 33 there is secured to the shaft 32 a face cam 77 having a hub 78 pinned or otherwise fastened to the shaft (Figs. 1 and 2). One edge of the cam 77, having the desired configuration to effect the proper timing, cooperates with a roller 79 mounted on the lower end of a bracket 80. This bracket is secured by screws or the like to the under face of a slide 81 arranged for reciprocation between a pair of guides 82. The coperating surfaces of the slide and guides are disposed at a suitable angle to both the vertical and the horizontal, preferably at an angle of about 45° to each. A pair of tension springs 83, attached at one end to a cross pin 83a carried by the bracket 80 and at its opposite end to a pin 83b carried by the rods 35, serves to draw the bracket 80 and hence the slide 81 toward the right, Fig 2, and to hold the roller 79 in engagement with the edge of the cam 77. A plate 84 is secured to the top face of the slide 81 by means of screws 84a and projects laterally toward the left therefrom, Figs. 3, 4 and 12. This plate carries at its outer end a transversely extending head 85 which may be formed integral with the plate or suitably secured thereto by welding or the like. The under surface of the plate 84 is preferably cut away along the side edges at its forward end to provide a central downwardly extending portion 86, Fig. 12, which fits into a groove 87, Fig. 3, provided in the top of the slide 81. At the outer ends of the head 85 suitable pivot screws 88 are provided, these serving to pivotally support a pair of levers 89. Upwardly extending pins 90 carried by the levers are interconnected by a spring 91 to urge the adjacent ends of the levers against the side faces of the plate 84. At their opposite ends the levers are formed with slender finger-like extensions 92 normally disposed at the angle indicated in Fig. 3. When the slide 81 is shifted toward the left, however, by the cam 77 the levers 89 will be carried against stationary pins or studs 93 which cooperate with portions 94 of the levers and serve to rock the latter about their pivots 88 as the movement of the slide 81 toward the left continues. At the top of the head 85, adjacent its center, there is mounted a spring finger 95 which is secured by screws 96 to the head. The outer end of the spring finger is curled upwardly, as shown at 97 in Fig. 12, and adapted to be carried readily over the edge of a carton 98 positioned at the receiving end of the machine. This carton, as explained, may be introduced automatically or by hand. The closing flaps 99 of the carton are extended as shown in Fig. 3. It will be understood that the article to be packaged has previously been inserted in the carton. A guide block or plate 100 is provided at each end of the carton, these blocks being adjustably mounted on the table 13 by screws 101. The inner ends of the blocks 100 may suitably be beveled or curved over an appropriate arc to facilitate the introduction of a carton between them. As shown in Figs. 3 and 4, the inner ends of the blocks are spaced a distance equal to the length of one of the cartons with its end flaps extended and they are so positioned as to align the new carton properly with those being advanced through the machine.

As the slide 81 is shifted toward the left, Fig. 2, the finger 95 will ride over the top of the new carton added to the line until the forward edge of the head 85 strikes the vertical side wall of the carton. In the meantime, the levers 89 will have engaged the studs 93 and will have started to rock about their pivots 88 to swing the fingers 92 inwardly or toward each other. These fingers will at this time engage tabs 102 and fold these inwardly. As the operation continues the head 85 will serve to advance the line of cartons 98 which, as shown, are in an abutting series.

Shifting of the newly inserted carton toward the left, Fig. 2, will carry the tabs 103, at the opposite side of the carton from the tabs 102, into engagement with curved portions 104 of two guide rails 105 disposed vertically at the two sides of the line of cartons being advanced through the machine. If the tabs 102 and 103 are of such length as to overlap when folded inwardly, the arrangement is such that the tabs 103 will overlie the ends of tabs 102.

Figure 5:
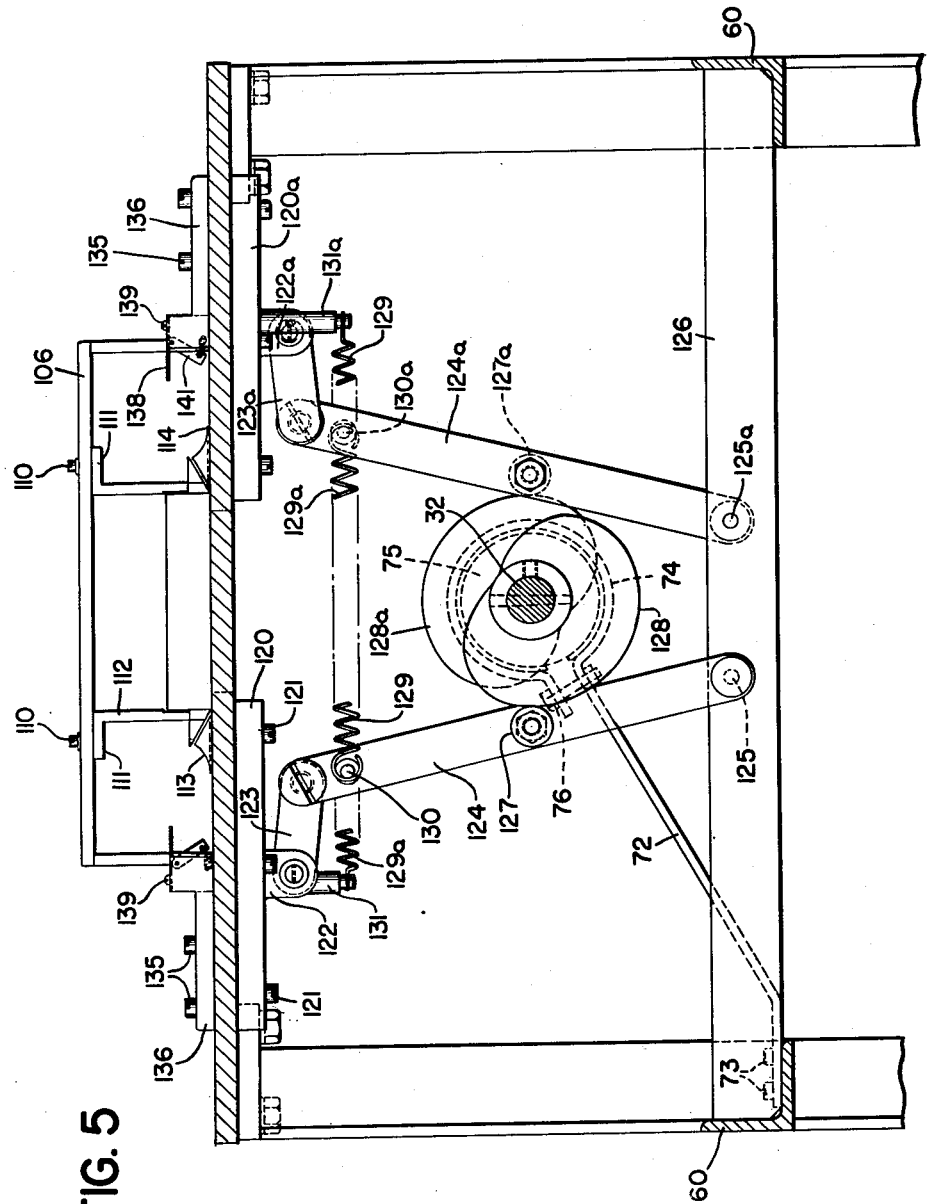
Fig. 5 is a transverse vertical section through the upper portion of the machine taken along the line 5—5 of Fig. 1.

The main portion of each of the guide rails 105 is parallel with the main axis of the machine and is spaced from said axis a distance equal to half of the length of the main body of a carton to be handled by the machine. The under surface 104a of each of the curved extensions 104 is rounded, as best shown in Figs. 11 and 12, to facilitate the passage of the end flaps of the carton beneath these extensions. The guide rails 105 are suspended from above the table and the arrangement is such that the entire lower edges of the rails are spaced slightly from the surface of the table as indicated in Figs. 11 and 12. This permits the free passage of the flap elements of the carton and enables the folding operations, to be hereinafter explained, to be readily performed. To support the guide rails a pair of bracket members 106 is provided (Figs. 2, 3 and 5). Each of these members extends transversely across the line of feed of the cartons and has its main horizontally extending portion spaced sufficiently from the tabletop to permit the free passage of the cartons beneath them. The downwardly extending leg portions of each bracket terminate in outwardly extending feet 107 secured to the table by means of screws 108. Elongated slots 109 extending lengthwise of the main portion of each bracket member in the region of the guide rails 105 are adapted to receive screws 110 which have threaded engagement with laterally extending arms 111 at the upper ends of vertically disposed portions 112 secured by welding or the like to the guide rails 105 and projecting upwardly therefrom. See the detail views of the guide rails in Figs. 17 and 18. It will be apparent that the arrangement described permits adjustment of the guide rails to suit cartons of different lengths and to eliminate the necessity of fine tolerances in manufacture.

To assist in the folding of the end flaps a pair of plow members 113 is provided. One of these is shown in detail in Figs. 19 and 20. Their forward edges 114 are sharpened to substantially a knife edge and their forward portions are curved in a manner to facilitate the free movement of the flaps onto the upper surfaces of these plow members. Engagement of the flap members with the forward edges of the plow members is preferably arranged to occur upon the second movement of a carton after it has been introduced into the line. On successive movement of each carton along the line of feed its end flaps will ride up the gentle slope of the plow members and will, after four or five such movements, attain an angle of about 30° to the horizontal. This is indicated by the slope of the terminal end 115 of the plow member. For supporting these members, each is provided with a bracket element 116 secured to the under face of the plow by brazing or welding. The bracket members are of angled construction, the slope of the angle corresponding with that of the plow at the point of attachment of the bracket member to the plow. The horizontally disposed arm of the bracket is provided with an opening 117 through which a screw may be passed to secure the plow to the tabletop. Adjacent the point 114 of the plow a countersunk opening 114a may be provided to receive a further screw for attachment of the plow to the tabletop.

At a suitable point along the path of movement of the cartons, at which the flap elements have been bent upwardly through an angle of about 30° by the plow members 113, the flaps are operated upon by a pair of reciprocating members which are moved in a direction transverse to the direction of movement of the cartons. Each of these reciprocating members has portions adapted to act simultaneously upon a pair of adjacent cartons. The arrangement is such that the outer portion of the flap of one carton is folded inwardly about a crease line 99b indicated in Fig. 4. At the same time the adjacent carton, which is one step further along the line of movement, is subjected to an operation by which the end of each of the flaps is inserted between the upper edge of the infolded tabs and the top wall of the carton. The two reciprocating members for performing these functions at the two ends of the adjacent cartons are substantially identical. They differ only in that one part of the assembly is of right hand construction for one member and of left hand construction for the other.

Referring now to Figs. 1, and 2, the flap folding and inserting mechanism includes a slide 119 having beveled side edges cooperating with corresponding edges on guide rails 120 secured by screws 121, or the like (Fig. 5), to the under face of the table top 13. The slide 119 has secured to its under face, by welding or the like, an element 122 providing a pair of spaced downwardly extending ears. This element is secured to the slide adjacent its end which is closest to the line of movement of the cartons (Fig. 10). A link 123 (Fig. 5) has one end inserted between the ears of the element 122 and is pivotally connected with the latter. The opposite end of the link is pivotally connected with the upper end of a lever 124 which is pivotally mounted at its lower end on a stud 125 having screw threaded engagement with a plate 126 carried by, and preferably welded to, the two angle members 60 at the sides of the supporting structure of the machine. At an intermediate point the lever 124 carries a roller 127 adapted to cooperate with the periphery of a cam 128 secured to the main operating shaft 32. A spring 129 having a hook end attached to a pin 130 extending laterally from the lever 124, adjacent its upper end, serves to hold the roller 127 against the periphery of the cam. The opposite end of spring 129 is attached to a depending pin or stud 131a carried by a guide rail 120a associated with the other of the two reciprocating members. It will be understood that this other reciprocating member includes a reciprocatory slide 119a (Fig. 10) mounted for rectilinear movement between a pair of guides 120a. An element 122a secured to the under surface of slide 119a has a pair of downwardly extending ears adapted to straddle one end of a link 123a (Fig. 5) which is pivotally connected with the element 122a. The opposite end of link 123a is pivotally connected with the upper end of a lever 124a pivoted at 125a to the plate 126. A roller 127a, intermediate the ends of the lever, cooperates with the periphery of a cam 128a and is held against the surface of the latter by a spring 129a attached to the lever by means of a pin 130a and secured at its other end to a downwardly extending pin or stud 131 carried by one of the guides 120.

The foregoing arrangement is such that the two slide members 119 and 119a will be reciprocated in synchronism, but in opposite directions. During a portion of the cycle of the machine, they will be both shifted toward the line of cartons being advanced through the machine and during other portions of the cycle they will be both shifted away from the line of movement of the cartons. Moreover, the timing of the cams 128 and 128a is such that the slides will be reciprocated during a period in the cycle of the machine at which the carton feeding slide 81 is being held stationary by a dwell in the face cam 77. Conversely the carton advancing movement of the slide 81 is timed to occur during a period in the cycle when the slides 119 and 119a are stationary, due to dwells in the cams 128 and 128a. There may, of course, be a certain overlapping in the movements of the slides so long as the effective periods of operation of the devices carried by the respective slides occur at different times in the cycle of operation of the machine.

Returning now to slide 119, the latter has secured to its upper surface, by welding or the like, a block or plate 132 (Fig. 10). This cooperates with and extends through an elongated slot 13a provided in the table top 13 transversely of the line of movement of the cartons. The slot is of adequate length to permit the reciprocating movement of the slide as above explained. At its inner end, i. e. the end closest to the path of the cartons, the block 132 is rabbeted slightly, as indicated at 133 to provide clearance for parts to be described. The block is also provided with tapped holes 134 along its longitudinal axis for the reception of screws 135 which extend through slightly elongated slots 135a in a member 136. The arrangement is such that slight adjustment of the member 136, toward and away from the line of movement of the cartons, is permitted in relation to the block 132. Member 136 has an enlarged head portion 137 at its inner end, i. e., the end toward the path of movement of the cartons. The height of the head portion 137 is only slightly less than the height of the cartons as they are advanced along the table top. A thin blade-like member 138 is secured to the top of the head by means of a screw 139. This blade-like member, which serves as a flap guide in the course of inserting the flap in the carton, may suitably be formed of flat spring stock and it is preferably tapered toward its outer end to a relatively sharp edge (Fig. 13). Disposed centrally beneath the blade 138 is a vertically extending channel 137a extending from top to bottom of the inner face of the head 137. Within this channel there is pivotally mounted, on a pin 140, a small pad element 141. The latter has a small socket adjacent its lower end to receive the end of a coil spring 142, the opposite end of which is held by a similar socket in the head 137. Spring 142 normally rocks the pad 141 into a position, slightly beyond that shown in Fig. 13, which substantially corresponds with the slope of the end 115 of the plow element. A flattened surface 141a provided on the pad, cooperating with the inner wall of the channel 137a, serves to limit the outward swinging movement of the pad.

An L-shaped finger 143 (Figs. 3 and 4) extends laterally from the end of the head 137 and is secured to the latter by means of a screw 144. This finger has its under surface, which is preferably rounded slightly at its leading edge 143a (Fig. 9), disposed slightly above the upper surface of a triangular projection 145 integral with or welded to the guide rail 105. The lower edge 145a (Fig. 18) of this projection is inclined at the same angle as the end 115 of the plow element and is spaced only slightly above the latter. The arrangement is such that as the flap of the carton advances along the plow toward the free end thereof it passes beneath the surface 145a. While the cartons remain stationary on the table top and the slide 119, with member 136, is advanced toward the ends of the adjacent cartons, the finger 143 will engage the outer end of the flap and will fold it over the top of the projection 145 around the sharp outer edge 145b of the latter. The flap is preferably provided with a preformed score line or crease 99b (Fig. 4) along which it may be readily folded at the edge 145b. The vertical spacing of the finger 143 and the projection 145 is preferably such that there is just sufficient room between them for the folded end of the flap. Accordingly, an ironing action is imparted to the end of the flap which tends to retain it in the folded condition as the slide carrying the finger 143 is retracted.

Simultaneously with the folding and ironing action on the flap of the carton positioned in line with the projection 145, the knife-like folding element 138 will act upon the previously folded flap of the carton which is one step further advanced along the path of movement. As best shown in Figs. 10 and 13, the sharp end of the element 138 passes just beneath the top wall of the aligned carton and at about the same time the pad 141 engages the upwardly inclined portion of the flap. As the movement of the slide 119 continues in the direction toward the cartons, the free folded end of the flap will be guided by the lower surface of the element 138 into the space just above the infolded tabs of the carton. Pad 141 will gradually be swung downwardly into the channel 137a and the insertion of the flap will then be completed in the manner indicated in Fig. 10. As best shown in Figs. 17 and 18, the guide rail 105 is provided with a thin blade-like extension 146 preferably having a thickness of not more than about .010". This member may be formed of Phosphor bronze and may be secured in any suitable way as by brazing to the inner side surface of the rail. Its inner face should be flush with the inner face of the rail. Member 146 extends a sufficient distance to be included within the fold of the flap of the carton as the latter is inserted in the manner just explained as indicated in Figs. 10 and 13. It serves to hold tabs 102 and 103 in folded position until flap 99 has been completely inserted. It will be understood that as each carton in the line is advanced beyond the flap inserting station it will ride off of the end of the finger 146.

While I have described in detail the construction and operation of the flap folding and inserting elements carried by one of the slides 119, it will be understood that similar elements are carried by the other slide 119a to perform the same functions at the opposite end of the cartons. The member 136, head 137, and finger 143 associated with the slide 119a will, however, be of opposite hand from that described. Thus, as the two slides are advanced toward each other, the fingers 143 will act upon the flaps at the opposite ends of the same carton and, likewise, the blades 138 and pads 141 will assist in inserting the flaps in the two ends of a single carton.

Briefly summarizing the operation of the illustrated machine, the main drive shaft 32 will normally be at rest in the position indicated in Fig. 2 and the various parts will be in the positions in which they are are shown in Figs. 1, 2, and 3. The clutch will be disengaged due to the retraction of the block or plunger 44, at the end of the preceding cycle, through its cooperation with the block 62 carried by the clutch control lever 57. A new carton 98 is then inserted between the guide blocks 100, in the position shown in Fig. 3, and the operator depresses the treadle 68 to cause a downward rocking movement of the lever 57 which disengages the block 62 from the clutch block 44. The toothed end of the latter then engages the first notch 53 that is brought into line with its outer end during the continuous rotation of the disc 54. The driven clutch member 40 and shaft 32 are now carried through one revolution to perform a cycle of operation of the machine. During this cycle slide 81 is shifted toward the left (Fig. 3) to carry the crosshead 85 into engagement with the newly inserted carton and to advance the line of cartons one step, i. e., the width of one carton. As the crosshead moves toward the new carton and prior to the advance of the cartons, the fingers 92 will swing inwardly to infold the tabs 102. As the cartons are advanced, the opposite tabs 103 will be infolded by the action of the curved portions 104 of the guide rails 105. After the cartons have been shifted to their new positions, the slides 119, with their members 136, will be shifted toward each other and toward the outer ends of the cartons positioned between them to simultaneously effect the folding and creasing of the outer ends of the flaps of the particular carton aligned with the fingers 143 and to insert the prefolded flaps of the adjacent carton which is aligned with the knife elements 138. The flaps will have been folded upwardly and held at an angle of about 30° to the horizontal by the plow elements 113 prior to the folding and creasing operations of the fingers 143. This will have occurred in the course of movement of the cartons from the receiving end of the machine to the position aligned with the fingers 143. As the cartons continue to advance beyond the flap folding and inserting positions, they may be removed from the machine either by hand or automatically by a suitable conveyor.

In Figs. 21 to 24 inclusive there is shown a modified arrangement for infolding the tabs at the ends of the cartons. This includes a slide 150, similar to slide 81 of the embodiment described above, arranged to be reciprocated under the control of a face cam or the like. The slide is retained on the top surface of the table and is guided in its reciprocatory movements by a pair of guides 151. At the left end of the slide (Fig. 21) there is mounted a T-shaped pusher member 152 which is secured to the slide by screws 153. The cross-head of the pusher member is formed by laterally extending arms 154. To the upper surface of these arms is secured a plate-like element 155 serving the function of the spring finger 95 of the first embodiment. This plate-like element is secured by screws 156 to the crosshead and is adapted to be carried over the top surface of a new carton 157 introduced into the machine.

As best shown in Fig. 22, each arm 154 of the crosshead has a laterally extending, top portion 158 which, with the top of the table, forms a recess beyond a vertical edge 159. The laterally extending portion 158 is provided with a tapped hole 160 arranged to receive the upper, screw-threaded end of a stud 161 having an enlarged head 162 at its lower end. Mounted for pivotal movement on the stud 161 is a member 163 (Fig. 24) which is normally urged in a counter-clockwise direction by a coil spring 164. This has an upwardly extending end inserted in an opening 165 in the part 158 and a downwardly extending end inserted in an opening 166 provided in the member 163. The extent of counter-clockwise movement of the member, by the spring, is limited by the engagement of a flat surface 167 thereon with the shoulder 159 of the arm 154.

Member 163 is provided with two fingers or arms 168 and 169 which extend outwardly from the pivotal axis and are disposed at substantially a right angle with respect to each other. As the slide 150 is shifted toward the left (Fig. 21) the arm or finger 168 will engage the forwardly facing wall of the newly inserted carton, thereby causing the member 163 to be rocked clockwise (Fig. 24) as the movement of the slide continues. In the course of such clockwise movement, the blade-like arm 169 will engage the tab 171 of the carton and fold it inwardly. Upon further movement of the slide the opposite tab 172 will engage the outwardly bent portion 173 of a guide rail, similar to the member 105 of the first embodiment. The outer face of the arm 154 is recessed, as indicated at 174 in Figs. 22 and 24, to permit the finger 168 to enter the same and present an outer face substantially flush with that of the crosshead. It will be understood that the opposite arm 154 of the crosshead is similarly constructed and provided with a pivoted member 163 to fold the tab 171 at the opposite end of the carton inwardly in the manner described. The arrangement is such that if the tabs 171 and 172 are of sufficient length to overlap, the tab 172 will overly the tab 171 and the timing of the two folding actions is such as to avoid interference.

While an illustrative machine embodying the invention and a modified form of certain of the parts have been disclosed in considerable detail, it will be understood that various other changes may be made without departing from the general principles and scope of the invention.

By way of example, the face cam 77 for operating the carton advancing slide 81 may be reversed, if desired, and the springs 83 may likewise be reversed, so that the slide will be spring urged to advance the cartons and positively operated in the opposite direction. So also the mounting of the several operating devices may be modified in various respects. For example, the main shaft 32 may be positioned closer to the under surface of the table and various connections shortened. Thus the arm 80 may be made shorter and more direct connections may be provided from the slides 120 and 120a to the cams 128 and 128a (Fig. 5). The levers 124 and 124a may be eliminated and rigid arms similar to arm 80, which extend downwardly from the slides mentioned, may carry rollers which engage the cams directly. The means for retaining and guiding the several slides may also be varied. Other variations will occur to those skilled in the art.

What I claim is:

1. A machine for closing cartons having tabs and a closing flap at each end thereof which comprises a flat support, reciprocating means for advancing a series of said cartons along said support in continuous abutting relation, means effective upon operation of said reciprocating means for inwardly folding the tabs at each end of a carton introduced into said series, and a single reciprocatory member at each side of said series of cartons operating conjointly with said reciprocating means upon a plurality of other cartons in said series for folding and inserting the flaps at the two ends of said cartons, each of said members carrying a yieldably mounted element arranged to engage one of said flaps to support the same as the flap is being inserted.

2. A machine for closing cartons having tabs and a closing flap at each end thereof which comprises a flat support, reciprocating means for advancing a series of said cartons along said support in continuous abutting relation, means effective upon operation of said reciprocating means for inwardly folding the tabs at each end of a carton introduced into said series, and means operating conjointly with said reciprocating means upon a plurality of other cartons in said series for folding and inserting the flaps at the two ends of said cartons, said last mentioned means comprising a reciprocatory member at each side of said series of cartons, and an element pivotally mounted on each of said reciprocatory members and yieldingly urged against said flaps as they are inserted.

3. A machine for closing cartons having tabs and a closing flap at each end thereof which comprises a flat support, reciprocating means for advancing a series of said cartons along said support in continuous abutting relation, means including a plurality of elements pivotally mounted on said reciprocating means effective upon operation of said reciprocating means for inwardly folding the tabs at each end of a carton introduced into said series, and means operating conjointly with said reciprocating means upon a plurality of other cartons in said series for folding and inserting the flaps at the two ends of said cartons.

4. A machine for closing cartons having tabs and a closing flap at each end thereof which comprises a flat support, reciprocating means for advancing a series of said cartons along said support in continuous abutting relation, means including a plurality of elements pivotally mounted on said reciprocating means effective upon operation of said reicprocating means for inwardly folding the tabs at each end of a carton introduced into said series, said elements having portions arranged to engage said tabs and fold the same inwardly, spring means for urging said elements into inactive positions, means cooperating with said elements to rock the same on their pivots to effect folding of said tabs upon movement of said reciprocating means in one direction, and means operating conjointly with said reciprocating means upon a plurality of other cartons in said series for folding and inserting the flaps at the two ends of said cartons.

5. In a machine for closing cartons, means for inserting the end flaps of the cartons which comprises a blade-like element arranged to extend across the open end of a carton, a member movable toward and from said end of the carton, said member having a flap supporting element yieldingly held in an inclined position, a blade-like element carried by said member and extending over said flap supporting element toward said open end of the carton and arranged to enter the same just below the upper wall thereof, and means for moving said member toward and from the end of said carton to insert said flap, said flap supporting element being rocked into a vertical position as said member approaches the end of the carton.

6. In a machine for closing cartons, means for inserting the end flaps of the cartons which comprises a blade-like element arranged to extend across the open end of a carton, a reciprocatory member movable toward and from said end of the carton, a flap engaging and supporting element pivotally mounted on said member, spring means for urging said element into a predetermined inclined position, a blade-like element carried by said member and extending over said flap supporting element toward said open end of the carton and arranged to enter the same just below the upper wall thereof, and means for reciprocating said member toward and from the end of said carton to insert said flap, said flap supporting element being rocked into a vertical position as said member approaches the end of the carton.

7. In a machine for closing cartons, means for inserting the end flaps of the cartons which comprises a blade-like element arranged to extend across the open end of a carton, a member movable toward and from said end of the carton, said member having a flap supporting element yieldingly held in an inclined position, a blade-like element carried by said member and extending over said flap supporting element toward said open end of the carton and arranged to enter the same just below the upper wall thereof, means for moving said member toward and from the end of said carton to insert said flap, said flap supporting element being rocked into a vertical position as said member approaches the end of the carton, and means for moving the carton and said first mentioned blade-like element relative to each other to disengage the same after the flap has been inserted.

8. In a carton closing machine, carton supporting means, a reciprocatory member for advancing cartons along said supporting means, and means for infolding the tabs of the cartons comprising a plurality of pivoted tab engaging elements carried by said reciprocatory member and means for rocking said elements upon the reciprocation of said member.

9. In a carton closing machine, carton supporting means, a reciprocatory member for advancing cartons along said supporting means, and means for infolding the tabs of the cartons comprising a plurality of pivoted tab engaging elements carried by said reciprocatory member, and stationary abutments arranged to be engaged by said elements for rocking said elements upon the reciprocation of said member.

10. In a carton closing machine, carton supporting means, a reciprocatory member for advancing cartons along said supporting means, and means for infolding the tabs of the cartons comprising a plurality of pivoted tab engaging elements carried by said reciprocatory member, spring means for urging said elements into inactive position, and pins carried by said supporting means in the path of said elements for rocking the same as said member is moved to advance the cartons.

11. In a machine for closing cartons having inwardly foldable tabs at its ends, carton supporting means, a reciprocatory member for advancing cartons along said supporting means, and means for infolding the tabs of the cartons comprising a plurality of pivoted, tab-engaging elements carried by said reciprocatory member, said elements being spring urged into an inactive position and being rocked upon movement of said member in the carton advancing direction to engage and fold the tabs.

12. In a machine for closing cartons having inwardly foldable tabs at its ends, carton supporting means, a reciprocating member for advancing cartons along said supporting means, and means for infolding the tabs of the cartons comprising a plurality of pivoted, tab-engaging elements carried by said reciprocatory member, each of said elements having a pair of angularly disposed arms, spring means normally urging said elements into one position, one of said arms of each element being arranged to engage a carton and to cause rocking of said element counter to the action of said spring means upon movement of said member in one direction, the other arm of each of said elements being arranged to engage and fold a tab on said carton upon such rocking of said elements.

13. In a machine for closing cartons having a inwardly foldable tab at at least one end thereof, carton supporting means, a reciprocatory member for advancing cartons along said supporting means, and means for infolding the tabs of the cartons comprising a pivoted, tab-engaging element carried by said reciprocatory member, said element being spring urged into an inactive position and being rocked upon movement of said member in the carton advancing direction to engage and infold the tab of one of said cartons.

JAMES D. BROWN.

REFERENCES CITED

The following references are of record in the file of this patent:

UNITED STATES PATENTS

| Number | Name | Date |
|---|---|---|
| 767,395 | Doble | Aug. 16, 1904 |
| 1,571,716 | Fishwick | Feb. 2, 1926 |
| 2,340,835 | Malhiot | Feb. 1, 1944 |
| 2,542,083 | Holstebroe et al. | Feb. 20, 1951 |